April 9, 1946.　　　E. M. ROGERS　　　2,398,328
TUBE LEAKAGE TESTING MACHINE
Filed July 1, 1943　　　4 Sheets-Sheet 4

Inventor
Eli M. Rogers,
By C. B. Stevens
Attorney

Patented Apr. 9, 1946

2,398,328

UNITED STATES PATENT OFFICE 2,398,328

TUBE LEAKAGE TESTING MACHINE

Eli M. Rogers, Dayton, Ohio, assignor to United Aircraft Products, Inc., Dayton, Ohio, a corporation of Ohio Application July 1, 1943, Serial No. 493,091

12 Claims. (Cl. 73—41)

This invention relates to testing machines, and has particular reference to a machine for testing short-length pipe sections or tubes to determine whether the same actually contain leak-holes, cracks or the like, or such weaknesses or imperfections as may result in the formation of leak holes, cracks or the like therein, when they are subjected to either internal or external fluid pressure.

In heat exchange and analogous devices, large numbers of short-length tubes are employed to break up a body of a liquid or other fluid to be cooled or heated and to conduct a cooling or heating medium, such as air, in heat exchange relationship to said liquid or fluid. Usually the tubes extend through a casing from end to end thereof in parallel, slightly spaced relationship to each other to divide the casing into a maze of narrow passageways through which the liquid or other fluid to be cooled or heated flows. The tubes are usually open at their ends to provide for free flow of the air or other cooling or heating medium therethrough. The tubes may, however, be employed in various other manners. In any event, it is essential that the tubes be leak-proof, or entirely free of any holes, cracks or the like through which either the fluid to be cooled or heated, or the cooling or heating medium, may leak. Also, it is equally essential that the tubes be entirely free of any weaknesses or imperfections which might develop into leak holes, cracks or the like under the pressure of the fluid to be cooled or heated, or under the pressure of the cooling or heating medium, in any instance where said fluid or said medium is subjected to pressure, as is usually the case with respect to at least one of them.

Heretofore the testing of pipe sections or tubes such as mentioned to determine whether they contain leak-holes, cracks or the like or other imperfections has been quite tedious and time-consuming, and where large numbers of the tubes are involved, as in the quantity production of heat exchange and analogous devices such, for example, as coolers for the lubricating oil of aircraft and other engines, the testing of the tubes prior to their installation in such devices has been an item of considerable expense.

Accordingly, the general object of the present invention is to provide a simple, inexpensive, practical machine through the instrumentality of which a single, unskilled operator may conduct leak-hole and imperfection tests of larger numbers of short length pipe sections or tubes expeditiously and at a minimum of expense, thus to contribute materially to the rapid, economical production of devices such as mentioned wherein short-length pipe sections or tubes are employed in large quantities.

With the foregoing general object and various lesser objects in view, the invention consists in a short-length pipe section or tube testing machine embodying the novel features of construction, combination and arrangement of parts as will be hereinafter more fully described, illustrated in the accompanying drawings and defined in the appended claims.

In the accompanying drawings, wherein like characters of reference denote corresponding parts in the different views.

Referring to the drawings in detail, it will be observed that the present testing machine comprises a frame designated generally as A, and that this frame, according to the specific embodiment of the invention illustrated in the present instance, comprises a front end unit including a pair of legs 10, 10, connected together by a cross member in the form of a plate 11. A similar rear end unit includes a pair of legs 12, 12 connected together by a cross member in the form of a plate 13; a pair of laterally spaced-apart, longitudinally extending members 14, 14 connecting said front and rear end units at one side of said frame, and a similar pair of laterally spaced longitudinally extending members 15, 15 connecting said front and rear units at the other side of said frame.

The frame A may be of any suitable length and width and may be constructed from any suitable material, being fabricated, for example, primarily from angle iron. In any event, suitable bearings 16 and 17 are provided at the front and the rear ends of said frame, respectively, and in said bearings are journaled shafts 18 and 19, respectively, which are horizontally disposed and which extend transversely with respect to said frame.

At one side of the frame A and extending longitudinally with respect thereto is an outer, endless sprocket chain 20 which is disposed in a vertical plane and which is trained over a pair of sprocket wheels 21 and 22 which are fixed to the shafts 18 and 19, respectively, while at the other side of said frame and extending longitudinally with respect thereto is another endless sprocket chain 23 which likewise is disposed in a vertical plane and is trained over another pair of sprocket wheels 24 and 25 fixed to said shafts 18 and 19, respectively.

In addition, two other endless sprocket chains 26, 26 extend longitudinally of the frame A inwardly with respect to the sprocket chains 20 and 23 and are disposed in vertical planes and trained over pairs of sprocket wheels 27 and 28 fixed to the shafts 18 and 19, respectively.

Any suitable means is provided for rotatably driving one of the shafts 18 or 19 and thereby driving the endless chains 20, 23 and 26, which means comprises, for example, a suitably driven sprocket chain 30 trained over a sprocket wheel 31 fixed on the shaft 18. The direction of the drive is such that the upper flights or reaches of the chains 20, 23 and 26 travel from the front end toward the rear end of the machine.

Carried by the sprocket chains 26, 26 at spaced apart intervals therealong and projecting outwardly therefrom are tube pick-up and carrier members 32 which may be of any suitable construction and which are illustrated in the present instance as comprising small, flat plates each having therein a V-shaped recess 33 opening through its outer end.

The short-length tubes 34 to be tested may be fed to the machine in any suitable manner as, for example, by gravity over a slideway 35 located at the front end of the machine. The slideway 35 is inclined downwardly toward the front end of the machine and at its free or discharge end is provided with fingers 36 having terminal saddle formations 37 in which the tubes 34 which gravitate downwardly over said slideway successively come to rest and from which they are successively removed by the pick-up members 32 carried by the chains 26, 26. In this connection it will be noted that each of the pick-up members 32 includes a relatively short arm 38 in front of the V-shaped recess 33 therein and a longer arm 39 at the rear of the recess 33 therein, and that the saddle formations 37 are located so that a tube resting therein is supported horizontally in a position, not to be engaged by the shorter or leading arms 38 of an approaching pair of the pick-up members 32, but to be engaged by the outer end portions of the longer or trailing arms 39 of the said approaching pair of said pick-up members.

Accordingly, as the chains 26, 26 are driven, the longer arms 39 of the pair of the pick-up members 32 nearer to and approaching a tube 34 resting in the saddle formations 37, will lift or force said tube from said saddle formations and cause it to come to rest in the V-shaped recesses of said pair of pick-up members to be carried therewith. At the same time, the next tube of a row of the tubes 34 resting on the slideway 35, gravitates into the saddle formations 37 vacated by the first mentioned tube to be picked up and carried along by the next pair of the pick-up members 32. Thus, as the chains 26, 26 are driven, and assuming there is a constant supply of the tubes 34 to the slideway 35, it is apparent that each successive pair of the pick-up members 32 will pick up a single tube from said saddle formations 37 and carry the same along with the upper flights or reaches of said chains 26, 26 from the front toward the rear end of the machine. An attendant may, of course, readily insure a constant supply of the tubes to the slideway 35.

The sprocket chain 20 carries at its outer edge a series of blocks 40 which preferably are of rectangular shape in cross section as shown and which may be of any suitable lengths. These blocks are disposed in end to end relationship along the length of the chain 20 and may be attached to said chain for travel therewith in any suitable manner, as, for example, through the instrumentality of suitable brackets 41.

Each block 40 carries at its inner edge two or more cross members 42 the end portions of which project beyond the sides of the block, and in this connection it will be observed that the upper reach of the chain 20 is disposed between the pair of longitudinal frame members 14, 14 and at an elevation with respect thereto such that the said end portions of said cross members 42 travel slidably over the upper faces of said frame members 14, 14 and thereby support the blocks 40 against any downward movement.

It will further be observed in this connection that guide strips 43 are fastened upon the tops of the frame members 14, 14, and that the inner edges of these strips are engaged by the ends of the cross members 42, whereby the blocks 40 are held effectively against any side-wise movement during the major amount of their travel with the upper reach of the chain 20.

The sprocket chain 23 carries at its outer edge a series of blocks 44 which, as in the case of the blocks 40, preferably are of rectangular shape in cross section and which may be of any suitable lengths. Also, as in the case of the blocks 40, these blocks 44 are disposed in end to end relationship along the length of the chain 23 and may be attached to said chain for travel therewith in any suitable manner as, for example, by means of brackets 45 similar to the brackets 41. Moreover, each block 44 carries at its inner edge two or more cross members 46 the end portions of which project beyond the sides of the block, and the upper reach of the chain 23 is disposed between the pair of longitudinal frame members 15, 15 and at an elevation with respect thereto such that the said end portions of said cross members 46 travel slidably over the upper faces of said frame members 15, 15, and thereby support said blocks 44 against any downward movement. In addition, guide strips 47 are fastened upon the tops of the frame members 15, 15, and are engaged at their inner edges by the ends of the cross members 46, whereby the blocks 44 are held effectively against any sidewise movement during the major amount of their travel with the upper reach of the chain 23.

The sprocket wheels 21, 22, 24, 25 and 27, 28 all are of the same size. Therefore, the sprocket chains 20, 25 and 26 travel at the same speed. Moreover, the blocks 40 and 44, as they travel with the upper reaches of the chains 20 and 23, are disposed in a common horizontal plane. Furthermore, the tube pick-up members 32, as they travel with the upper flights or reaches of the chains 26, support the tubes 34 between the blocks 40, 44 and in a horizontal plane which is disposed approximately midway between the upper and the lower faces of said blocks. In addition, the spaced relationship of the blocks 40, 44, transversely of the machine, is such that the distance between the inner faces of said blocks, as they travel with the upper reaches of the chains 20, 23, is approximately equal to the length of the tubes 34 all of which are, of course, approximately of equal length. Thus, the ends of the tubes 34 are disposed closely adjacent to the inner faces of the blocks 40, 44.

Figure 10:
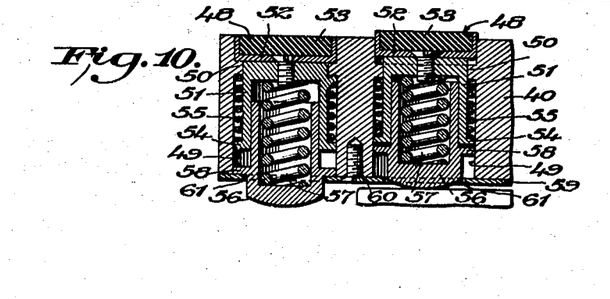
Figure 10 is a horizontal section through an end portion of one of the blocks of the machine which carries the plungers by which the pipe sections or tubes undergoing test are shifted to open the valves to admit testing air under pressure to the tubes.

Each block 40 carries at least one and preferably a plurality of cam-operated plungers, designated generally as 48, for shifting the tubes 34 lengthwise toward the blocks 44 for a purpose which will presently appear, each block 40 being illustrated in the present instance and by way of example as carrying eight of said plungers. For each plunger there is provided in each block 40 a bore 49 which extends through the block from side to side thereof and which has projecting into the same, near the inner side of the block, an annular rib 50 (Figure 10).

Each plunger 48 comprises a cup-like member 51 of an external diameter approximately equal to the internal diameter of the annular rib 49 and disposed therein for longitudinal sliding movement. At its end nearer the inner side of the block 40 the cup-like member 51 carries a shallow, cup-like member 52 which slidably fits the inner end portion of the bore 49 and opens toward the inner side of the block 40. In this shallow, cup-like member 52 is mounted a disk 53 of a soft, elastic material such as rubber, synthetic rubber or the like, the outer end face of which is exposed at the inner side of the block 40. At its other end said cup-like member 51 is provided with an outwardly extending annular flange 54, while between this flange and the rib 50 is interposed an expansion coil spring 55 which tends constantly to urge the cup-like members 51, 52 inwardly to their limits of inward movement as determined by engagement of the base of the cup-like member 52 with the rib 50. When said cup-like members are at their limits of inward movement the exposed outer face of the disk 53 is disposed flush, or approximately flush, with the inner face of the block 40 (see the plunger at the left hand end of Figure 10).

The cup-like member 51 is open at its end nearer the outer side of the block 40 and has slidably fitted therein and projecting beyond its open end a cam-follower element 56 which may be of any suitable form but which preferably is of tubular form open at its inner end and closed at its outer end as shown.

Between the closed outer end of this cam-follower element 56 and the closed bottom of the cup-like member 51 is interposed an expansion coil spring 57 which tends constantly to urge said cam follower element to its limit of outward movement as determined by engagement of an external annular flange 58 thereon with a cover plate 59 which is fastened against the outer face of the block 40 by screws 60. The outer end portion of the cam follower element 56 extends through an opening 61 in the cover plate 59 and when said element is at its limit of outward movement its outer end is disposed a predetermined distance beyond the outer face of said cover plate.

The spring 57 is stronger than the spring 55 so that when the cam follower element 56 is pushed inwardly the resistance of the spring 55 is overcome and the cup-like members 51, 52 also are pushed inwardly. When, however, the cam follower element is at its limit of outward movement, the spring 57 is substantially fully distended so that the spring 55 is permitted to act to hold the cup-like members 51, 52 at their limits of inward movement.

Figures 8, 9:
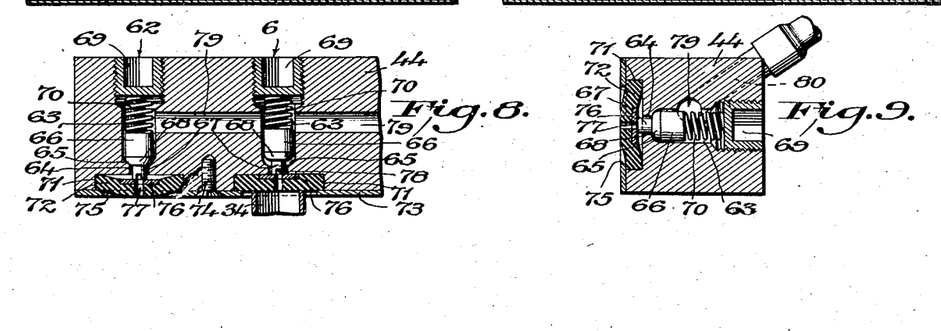
Figure 8 is a horizontal section through an end portion of one of the blocks of the machine which carries the valves through which air under pressure is supplied to the pipe sections or tubes being tested.
Figure 9 is a cross section through the blocks shown in Figure 8.

Each block 44 carries at least one and preferably a plurality of air flow control valves, designated generally as 62, for a purpose which will presently appear, each block 44 being illustrated in the present instance and by way of example as carrying eight of said valves. For each valve there is provided in each block 44 a bore 63 which extends through the block from side to side thereof and which, at a point adjacent to but spaced from the inner face of the block, is constricted, as indicated at 64, to provide an inwardly facing valve seat 65.

Each control valve 62 comprises a plug-like valve body 66 of somewhat smaller diameter than the bore 63 disposed in said bore and having a short stem 67 of somewhat smaller diameter than the constricted portion 64 of said bore disposed in said constricted portion. Mounted on the stem 67 in surrounding relationship thereto and disposed against the outer end of the valve body 66 is a ring 68 of soft, elastic material such as rubber, synthetic rubber or the like for seating cooperation with the seat 65.

The end portion of the bore 63 toward the outer side of the block 44 is closed by a plug 69, and between this plug and the valve body 66 is interposed an expansion coil spring 70 which tends constantly to urge the valve body toward the inner side of the block 44 and, consequently, to urge the ring 68 against the seat 65 to prevent any flow of air through the constricted portion 64 of the bore 63.

Outwardly of the constricted portion 64, the bore 63 is of enlarged diameter to provide in effect a shallow recess 71 opening through the inner portion of the block 44, and in this recess is disposed a disk 72 of soft, elastic material such as rubber, synthetic rubber or the like which is retained in said recess by a cover plate 73 fastened by screws 74 or in any other suitable manner against the inner side of the block 44. In the cover plate 73 is an opening 75 which is alined with the disk 72 so that the outer end of said disk is exposed at the inner side of the block 44.

The stem 67 is of a length such that its outer end engages the disk 72 centrally thereof and deflects the central portion of said disk outwardly when the valve ring 68 is seated against the seat 65 (see the control valve shown at the left hand end of Fig. 8), said disk 72 preferably having at its inner end, centrally thereof, a small, thin insert 76 of metal or other hard, wear-resisting material to be engaged by the end of the stem 67.

Extending centrally through the disk 72 is a small opening 77, while in the outer end of the stem 67 is a groove or kerf 78 which extends from side to side of said stem and opens through its said outer end.

Normally, the spring 70 acts through the valve body 66 to maintain the ring 68 seated against the seat 65 and to maintain the disk 72 deflected outwardly, and in this normal condition of the parts of the control valve any escape of air from the bore 63 through the constricted portion 64 thereof obviously is prevented. When, however, the disk 72 is deflected inwardly, the ring 68 is unseated and air is permitted to flow from the bore 63 through the constricted portion 64 thereof and via the groove or kerf 78 to and through the small opening 77 in the disk 72.

In each block 44 the bores 63 are connected together by a duct 79. In addition, at each end of each block 44 is a transverse duct 80 (Fig. 9) which is in communication with the duct 79 and, therefore, in communication with all of the bores 63 in the block.

At one end of one of the blocks 44 the duct 80 is plugged or otherwise suitably closed, while at the adjacent end of the next adjacent block 44 the duct 80 has connected therewith a hose or other suitable flexible tube or conduit 81 (Figure 1) which leads from any suitable source of supply of compressed air.

On the other hand, each remaining adjacent pair of the ducts 80 at adjacent ends of the blocks 44 are connected together by a length of hose or other suitable flexible tube or conduit 82. Manifestly, therefore, compressed air is present in all of the bores 63 and is prevented from escaping therefrom as long as the rings 68 are seated and the disks 72 are deflected outwardly, but is permitted to escape through the opening 77 in any given disk, or disks, 72 when the latter is, or are, deflected inwardly.

The plungers 48 and the control valves 62 are equal in number and are paired, each plunger being alined with its related control valve transversely of the machine. Moreover, there is a pair of the tube pick-up members 32 individual to each plunger 48 and its related control valve 62, and each pair of said tube pick-up members is arranged to support a tube in alinement with the related plunger 48 and control valve 62.

Figure 1:
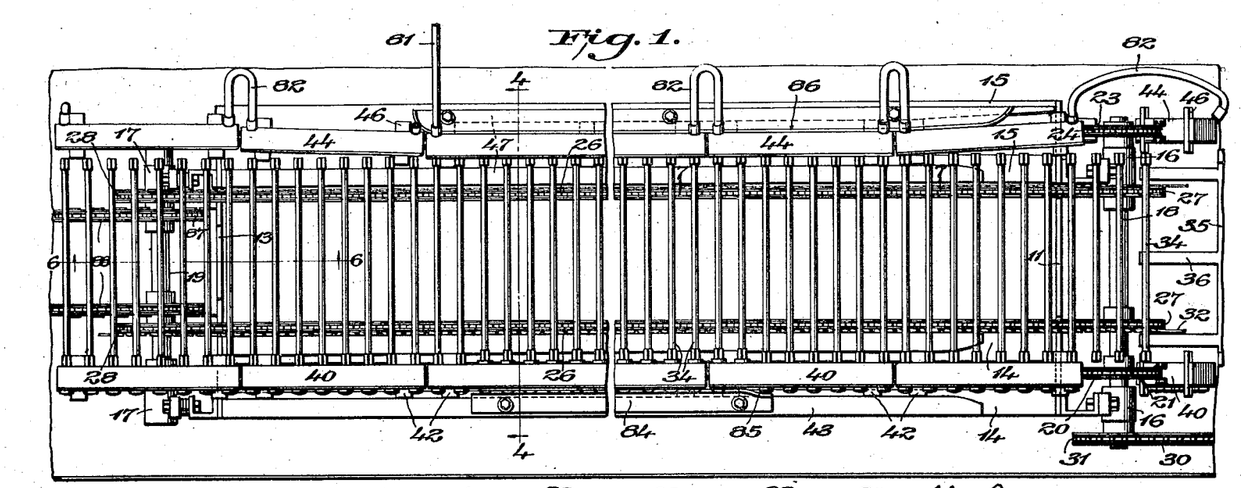
Figure 1 is a top plan view of a short-length pipe or tube testing machine constructed in accordance with one practical embodiment of the invention.
Figure 2:
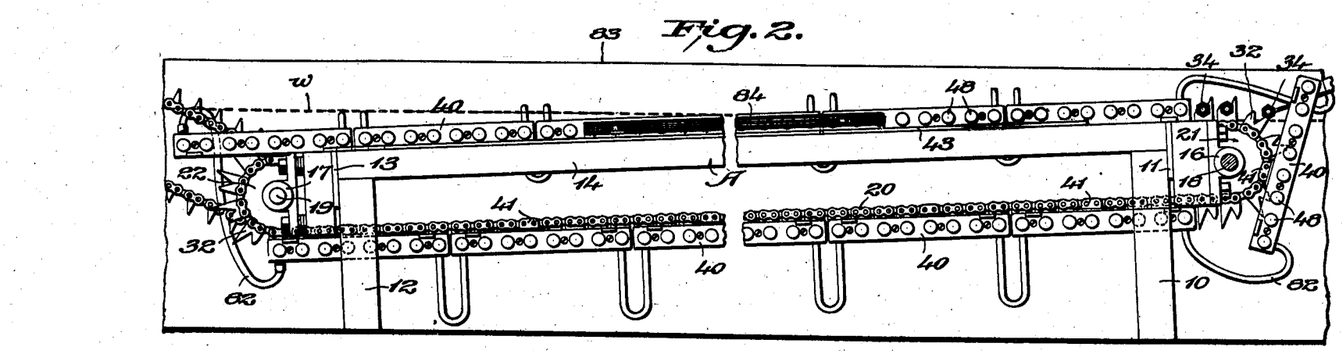
Figure 2 is a side elevation of the machine.
Figure 3:
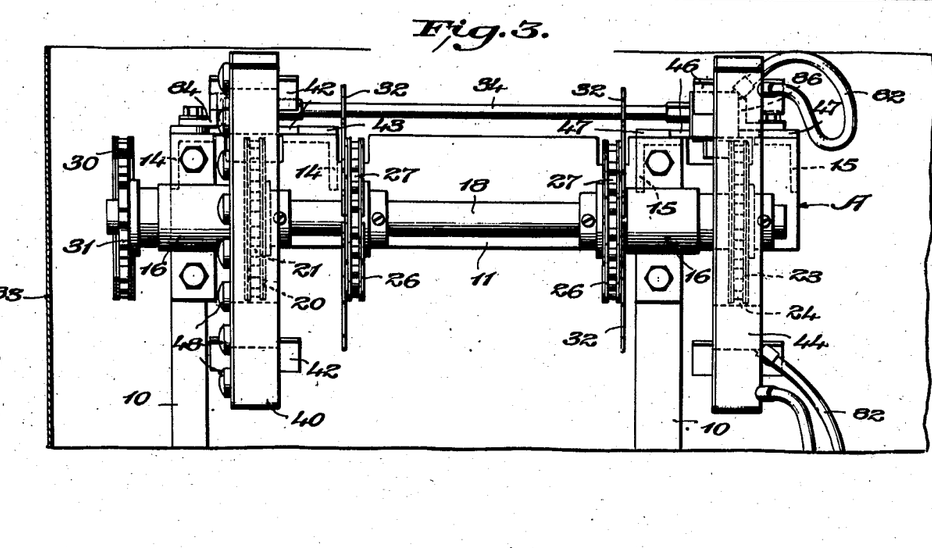
Figure 3 is a front end elevation of the machine.
Figure 4:
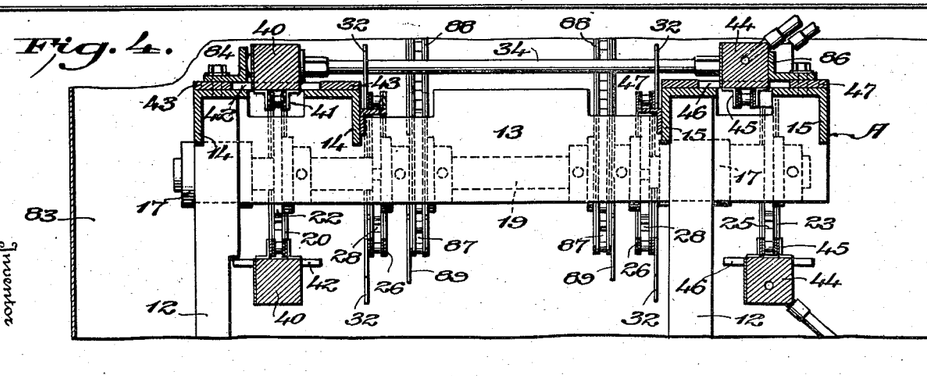
Figure 4 is a cross section through the machine on the line 4—4 of Figure 1.
Figure 5:
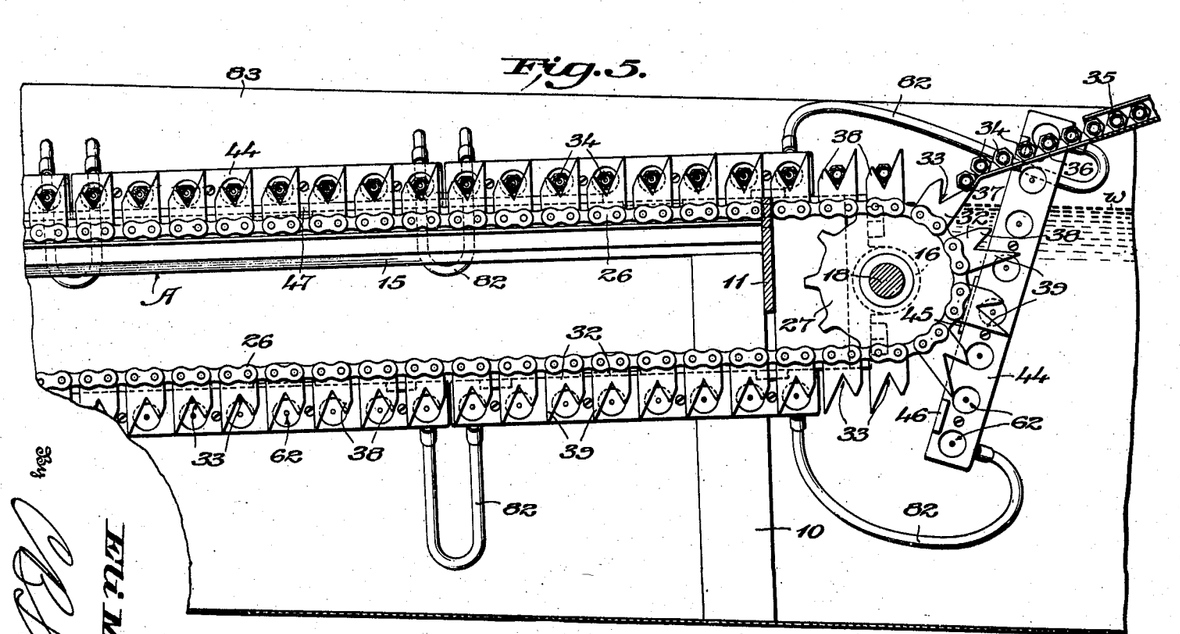
Figure 5 is a central, longitudinal sectional view through the front end portion of the machine.
Figure 6:
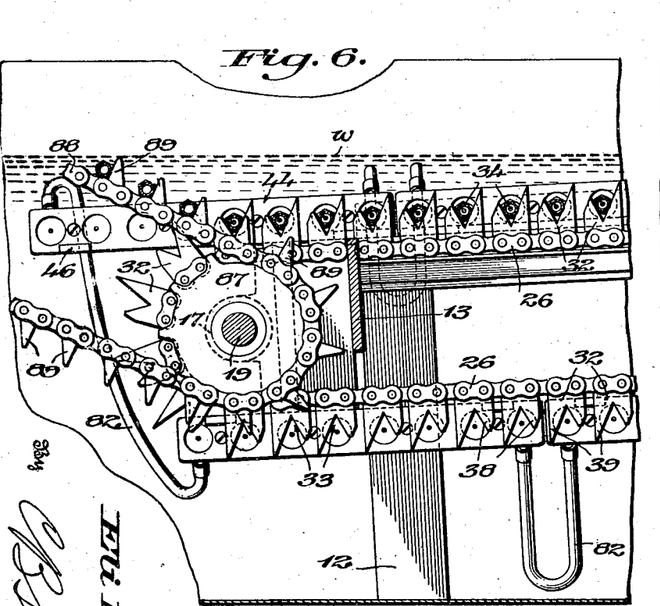
Figure 6 is a central, longitudinal section through the rear end portion of the machine.
Figure 7:
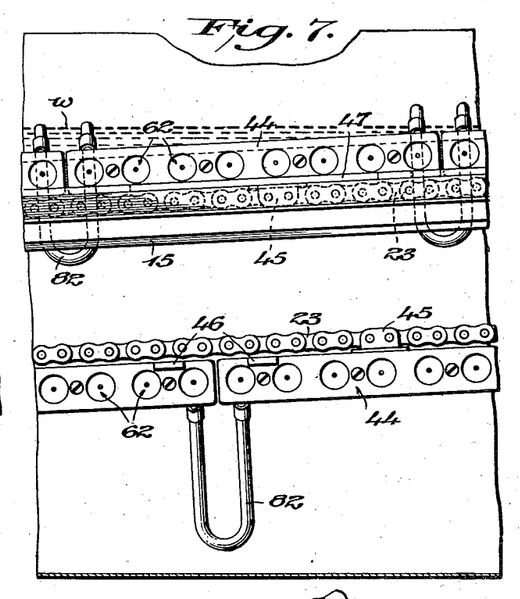
Figure 7 is a longitudinal section on the line 7—7 of Figure 1.

By reference to Figure 1 of the drawings it will be noted that the sprocket wheels 21 and 24 are spaced apart a distance such that the blocks 40 and 44, in traveling with the chains 20 and 23, respectively, and in approaching their horizontal positions upon the upper reaches of said chains, are spaced apart distances such that the distances between their inner faces amply exceeds the lengths of the tubes 34 to permit said tubes readily to be carried between said blocks.

It will further be noted that the guide strips 47 are disposed to deflect the upper flight or reach of the chain 23 inwardly and, consequently, to deflect the blocks 44 inwardly when said blocks reach their horizontal positions during their travel with the said upper reach of said chain 23. Therefore, while the tubes 34 are permitted readily to be carried between the blocks 40, 44, the blocks 44 obviously close inwardly toward the adjacent ends of said tubes following a certain amount of travel of said blocks with the upper flight or reach of the chain 23. In this connection, the guide strips 47 may be arranged to effect inward deflection of the upper reach of the chain 23 and the blocks 44 carried thereby either as soon as said blocks assume their horizontal positions or at any desired time thereafter. Moreover, said guide strips 47 may be of any desired lengths to maintain said blocks 44 deflected inwardly throughout any desired portion of their travel with the upper reach of the chain 23, but in any event they terminate sufficiently short of the rear or tube discharge end of the machine so that the upper reach of said chain 23 and the blocks 44 may move outwardly to permit the tubes 34 readily to be removed from between the blocks 40, 44 as they approach or reach the rear end of the machine.

The amount of inward deflection of the blocks 44 by the guide strips 47 is such that the ends of the tubes 34 are caused approximately to engage the inner faces of the disks 53, 72 without, however, exerting any endwise pressure against said disks.

Accordingly, if any given plunger 48 of a block 40 traveling with the upper flight or reach of the chain 20 within the end limits of the guide strip 47 is pushed inwardly, the related tube 34 will be moved endwise toward the related control valve 62. As a consequence, the ends of said tube will be caused to engage air-tightly against the disks 53, 72 and the outwardly deflected disk 72 will be deflected inwardly, thereby unseating the valve ring 68. Compressed air thereupon will be permitted to flow from the bore 63 through the constricted portion 68 thereof to and through the kerf 78 to the opening 77 in the disk 72 and through said opening 77 into the tube 34. In this connection it will be observed that the machine is substantially submerged in a body of water $w$ contained in a tank 83. It will be apparent, therefore, that if any given tube 34 which is supplied with compressed air contains a leak-hole, crack or the like, air will escape therethrough into the body of water $w$ and will bubble to the surface of the water, thereby affording an unmistakable visual indication that the tube contains a leak-hole, crack or the like. The attendant may then remove that particular tube from the machine as being imperfect and unsuitable for use.

Even though any given tube may not contain a leak-hole, crack, or the like, it may contain a portion so thin or otherwise so weak as to collapse under a pressure to which the tube is intended to be subjected in use. In this connection the testing air preferably is under a pressure at least as high as the maximum pressure which the tube is designed to sustain in use.

Accordingly, if the tube is too weak at any point to sustain the maximum pressure which it is designed to sustain in use, the weak portion thereof will collapse under the pressure of the testing air and the imperfection of the tube will be indicated by bubbling of the escaping air through the body of water $w$ to the surface thereof.

The machine includes means whereby certain of the plungers 48 of the blocks 40 traveling with the upper reach of the chain 20 within the end limits of the guide strips 47 are pushed inwardly in response to advance of said blocks and said plungers with the said upper reach of said chain. This means comprises a cam member 84 fixed in the path of movement of the projecting ends of the cam follower elements 56 so that as the latter advance and contact said member they are pushed inwardly and are held in inwardly pushed positions as long as they remain in contact with said member; i. e., during their travel within the end limits of said member.

The cam member 84 may comprise a length of angle-iron as shown, having one flange thereof disposed horizontally and bolted or otherwise suitably fastened upon the outer of the guide strips 43, and its other flange disposed vertically in the path of advance movement of the cam follower elements. At its approach end the vertical flange may be offset outwardly, as indicated at 85, to be initially engaged by the ends of the elements 56, and to effect inward movement of said elements, while throughout the remaining portion of its length said member is straight and is disposed to maintain pushed inwardly whatever number of said elements as may be engaged therewith.

When any given cam follower element 56 is pushed inwardly it acts through the related spring 57 to push the related cup-like members 51, 52, inwardly, thereby causing the related tube 34 to be shifted endwise with consequent opening of the related control valve 62 and delivery of compressed air to the tube with the results heretofore described. Obviously, because of the cam follower elements 56 being slidable relative to the cup-like members 51 and acting through the springs 57 to push said cup-like members inwardly, yielding pressure is exerted against the ends of the tubes 34 so that there is avoided any danger of the same being buckled under such pressure even though they may vary slightly in length and despite the fact that the cam member 84 positively effects definite amounts of inward movement of the cam follower elements 56.

As will be apparent from the foregoing, a number of the tubes 34, depending upon the length of the cam member 84, will be simultaneously and automatically supplied with testing compressed air as said tubes and the blocks 40, 44 advance with the upper reaches of the chains 26, 20 and 23, respectively.

Regarding the cam member 84, it will be noted that the horizontal flange thereof extends inwardly beyond the inner edge of the outer guide strip 43 and overlies the outer end portions of the cross members 42, thereby serving to hold the blocks 40 against any upward deflection as they advance along said cam member.

It will also be noted that an abutment member 86 similar to the cam member 84 is fixedly mounted upon the outer guide strip 47 to be engaged by the outer faces of the blocks 44 to hold said blocks against any outward deflection by the pressure exerted against the disks 72 by the tubes 34. It will further be noted that the abutment member 86 extends inwardly beyond the inner edge of the outer guide strip 47 and overlies the outer end portions of the cross members 46 whereby the blocks 44 are held against any upward deflection during the time that the tubes 34 are pressed endwise against the disks 72.

As the cam follower elements 56 move beyond the rear end of the cam 84, the springs 55, 57 return the parts of the plungers 48 to their normal positions shown at the left hand end of Figure 10, and at the same time release the tested tubes for removal from the machine at the rear end thereof.

Any suitable means may be provided at the rear or tube discharge end of the machine to remove the tested tubes from the machine. In this connection and as illustrated by way of example in the drawings, the shaft 19 may have fixed thereon a pair of sprocket wheels 87, 87 and over these sprocket wheels may be trained endless sprocket chains 88, 88 which may lead to any desired point of discharge for the tubes. On the sprocket chains 88 may be provided outwardly projecting fingers 89 to engage the tubes and transfer them from the pick-up members 32 to the chains 88 for conveyance with the upper reaches of the latter to the point of discharge.

It will be noted that the machine is disposed at a downward and rearward inclination in the tank 83 and that the level of the water in said tank is such as to submerge the blocks 40, 44 between the front end of the cam member 84 and the rear end of the machine, but not to submerge the blocks 40—44 between the front end of said cam member and the front end of the machine. This is to insure against the water entering and filling the tubes 34 prior to the ends of said tubes being effectively closed by the disks 53, 72 in response to projection of the plungers 48 by said cam 84.

From the foregoing description considered in connection with the accompanying drawings, it is believed that the construction and operation of the machine will be fully understood and its advantages appreciated. It is desired to point out, however, that while only a single specific embodiment of the machine has been illustrated and described, the same is readily capable of embodiment in specifically different constructions within the spirit and scope of the invention as defined in the appended claims.

I claim:

1. A tube testing machine comprising conveyor means for advancing the tubes to be tested, means operable in response to advance movement of said conveyor means to seal said tubes and to apply a clamping pressure endwise thereof, said means comprising oppositely disposed relatively movable units, and a valve in one of said units operable in response to the endwise clamping pressure on the tube to supply pressure fluid to the tube.

2. A tube testing machine comprising conveyor means for advancing the tubes to be tested and for supporting the tubes during their advance in parallel relationship to each other transversely with respect to their direction of advance, a series of plunger closure elements disposed in alinement with said tubes, respectively, adjacent to corresponding ends thereof, means for advancing said plunger elements in harmony with advance of said tubes, cam means disposed in the path of movement of said plunger elements to move the same into closing engagement with the related ends of the tubes and to effect endwise shifting movement of the tubes, a series of sealing disks movable in harmony and in alinement with said tubes respectively, adjacent to the opposite ends thereof to be engaged by and to close the said opposite ends of said tubes and to be displaced in response to endwise movement of said tubes, each disk having an opening therein for flow of testing fluid therethrough into the related tube, a source of testing fluid under pressure, a normally closed valve related to each disk and controlling flow of the testing fluid through the opening therein, and means engaged by and operable in response to displacement of said disks to open said valves to admit the testing fluid to the tubes.

3. A tube testing machine comprising an endless conveyor means for advancing the tubes to be tested and for supporting the tubes during their advance in parallel relationship to each other transversely with respect to their direction of advance, other endless conveyor means at opposite sides of said first mentioned conveyor means, respectively, and movable in harmony therewith, a series of blocks carried by each of said other conveyor means, plunger closure elements carried by one series of said blocks and alined with said tubes, respectively, displaceable disks carried by the other series of said blocks and alined with said tubes, respectively, cam means disposed in the path of movement of said plunger elements to urge the same into closing engagement with the related ends of the tubes and to shift the tubes endwise so that their opposite ends are engaged with and are closed by said disks and said disks are displaced, each disk having an opening therein for flow of testing fluid therethrough into the related tube, a source of testing fluid under pressure, and a series of normally closed valves carried by the second mentioned series of blocks one individual to and engageable with each disk for controlling flow of the testing fluid through the opening in the related disk, whereby displacement of said disks by endwise movement of said tubes opens said valves for admission of the testing fluid to the tubes.

4. A tube testing machine comprising an endless conveyor means for advancing the tubes to be tested and for supporting the tubes during their advance in parallel relationship to each other transversely with respect to their direction of advance, other endless conveyor means at opposite sides of said first mentioned conveyor means, respectively, and movable in harmony therewith, a series of blocks carried by each of said other conveyor means, plunger elements carried by one series of said blocks and alined with said tubes, respectively, deflectable disks carried by the other series of said blocks and alined with said tubes, respectively, cam means disposed in the path of movement of said plunger element to urge the same into closing engagement with the related ends of the tubes and to shift the tubes endwise so that their opposite ends are engaged with and are closed by said disks and said disks are deflected, each disk having an opening therein for flow of testing fluid therethrough into the related tube, a source of testing fluid under pressure, a series of normally closed valves carried by the second mentioned series of blocks one individual to each disk for controlling flow of the testing fluid through the opening in the related disk, means whereby deflection of said disks by endwise movement of said tubes opens said valves for admission of the testing fluid to the tubes, and means for spreading apart the respective series of blocks at the tube supply and delivery ends of the machine to permit the tubes readily to be admitted between and to be removed from between said last named means for moving the blocks of the respective series toward each other intermediate the ends of the machine to bring the plunger elements and the disks into operative relationship to the ends of the tubes.

5. A tube testing machine comprising a frame, a horizontal shaft at each end of said frame, sprocket wheels on said shafts, a pair of endless conveyor chains engaged with related pairs of sprocket wheels on said shafts, means for driving one of said shafts and thereby driving said conveyor chains, tube pick-up members carried by said conveyor chains, means for supporting the tubes to be tested and for successfully feeding them to a position to be picked up successively by the successive pick-up members, said pick-up members being effective to support the tubes in parallel relationship to each other transversely of the machine, other endless conveyor chains at opposite sides of said first mentioned pairs of conveyor chains, respectively, engaged with other of the sprocket wheels on said shafts and movable in harmony with said first mentioned conveyor chains, a series of blocks carried by each of said other conveyor chains, plunger elements carried by one of said series of blocks and alined with said tubes, respectively, movable disks carried by the other series of said blocks and alined with said tubes, respectively, cam means disposed in the path of movement of said plunger elements to urge the same into closing engagement with the related ends of the tubes and to shift the tubes endwise so that their other ends are engaged with and closed by said disks and said disks are moved, yieldable means through which said cam means acts to urge said plunger into engagement with the related ends of the tubes and to shift the tubes, each disk having an opening therein for flow of testing fluid therethrough into the related tube, a source of testing fluid under pressure, and a series of spring closed valves carried by the second mentioned series of blocks one individual to and engageable by each disk for controlling flow of the testing fluid through the opening in the related disk, whereby movement of said disks by endwise movement of said tubes engages and opens said valves for admission of the testing fluid to the tubes.

6. In a tube testing machine, a deflectable disk to have the end of a tube disposed thereagainst to close the end of the tube and to be deflected by pressure of the end of the tube thereagainst, said disk having an opening therein for flow of a testing fluid into the tube, a source of supply of testing fluid under pressure, and a spring closed valve controlling flow of the testing fluid to and through said opening, said valve including a stem engaged with said disk so that deflection of said disk opens said valve.

7. In a tube testing machine, a deflectable disk to have the end of a tube disposed thereagainst to close the end of the tube and to be deflected by pressure of the end of the tube thereagainst, said disk having an opening therein for flow of a testing fluid into the tube, a source of supply of a testing fluid under pressure, and a spring closed valve controlling flow of the testing fluid to and through said opening, said valve including a stem engaged with said disk so that deflection of said disk opens said valve, and said stem having in the end thereof that is engaged with said disk a kerf for flow therethrough of the testing fluid to said openings.

8. Apparatus for testing tubes by applying internal fluid pressure thereto, comprising a moving conveyor means, a train of tube supports on said conveyor, a tube supply station by which said conveyor means passes, means for feeding tubes seriatim from said station to said tube supports, a first series of interconnected blocks traveling with said conveyor means, a plunger in each of said series of blocks adapted to engage and close one end of an associated tube, a second series of interconnected blocks traveling with said conveyor means, a plunger in each of said second series of blocks oppositely disposed with respect to a plunger in said first series of blocks and adapted to engage and close the opposite end of the associated tube, means effecting an engagement between opposed plungers and each of said tubes during a predetermined portion of the travel of said tubes on said conveyor means, pressure fluid conduits in each block of one of said series of blocks and in the plunger therein, said conduits being arranged to direct pressure fluid to the interior of a closed tube, a source of pressure fluid, and means including flexible conduits between the blocks of said second series connecting said source of pressure fluid to the conduits in each block of said second series of blocks.

9. Apparatus for testing tubes by applying internal fluid pressure thereto, comprising a movable conveyor, a plurality of tube supports on said conveyor arranged to carry the tubes in spaced parallel relation, closure means for the tube ends movable with said conveyor, said closure means including a plurality of plungers and guides therefor arranged alongside said tube supports in such wise as to place an oppositely disposed pair of plungers adjacent the ends of each tube, means for effecting engagement of said plungers with said tube ends during a portion of the travel of said conveyor, said means tending to produce movement of said plungers relative to their guides following engagement of said plungers with the tube, and valve means operable by one plunger of each pair as said one plunger moves relatively to its guide for admitting pressure fluid to the tube.

10. Apparatus for testing tubes by applying internal fluid pressure thereto and facilitating observation of the results of such test; comprising a machine having conveyor means, a tube feeding mechanism for delivering tubes seriatim to said conveyor means, means for closing the ends of said tubes during a portion of their travel on said conveyor, and means for admitting compressed air to the interior of said tubes while the ends thereof are closed; a tank in which said machine is mounted; and a body of liquid in said tank, said machine being inclined within said tank in such manner that said tube feeding mechanism lies above the surface of the liquid, while the successive tubes are being placed on a conveyor, their ends closed, and filled with air before they are carried beneath the surface of the liquid.

11. A tube testing machine including conveyor means for advancing the tubes to be tested and for supporting the tubes during their advance in spaced parallel relation to each other transversely with respect to their direction of advance, a series of tube end sealing members disposed to one side of said conveyor means and movable in timed relation with the latter, a series of combined tube end sealing members and fluid control members disposed to the other side of said conveyor means and likewise movable in timed relation with the latter, said fluid control members, each including a flexible disk having an opening therethrough and a normally closed valve adapted to be actuated to open position by the disk when the same is flexed in one direction, a source of fluid under pressure, means connecting said fluid pressure source to said combined members and means cooperating with both series of members to cause the same to move toward each other to grip and seal the ends of a tube and to automatically admit fluid under pressure to the latter during a predetermined portion of its travel through the machine.

12. A tube testing machine, comprising a movable conveyor arranged to carry tubes which are disposed with their longitudinal axes transversely of the direction of motion of the conveyor, an endless series of tube supports mounted on said conveyor receiving tubes disposed with their longitudinal axes transversely of the direction of motion of the conveyor, separate endless series of tube end sealing members disposed on opposite sides of said conveyor and movable in timed relation therewith, means acting during the travel of said conveyor and sealing members to effect motion of said members toward each other and into sealing engagement with respective ends of the tubes, a pressure fluid conduit in each of one of said series of members for supplying pressure fluid to the interior of sealed tubes, means for supplying pressure fluid to one member of said one series, and flexible conduits interconnecting the pressure fluid conduits of each of said one series of members.

ELI M. ROGERS.